United States Patent [19]

Roman et al.

[11] Patent Number: 5,219,396
[45] Date of Patent: Jun. 15, 1993

[54] ARTIFICIAL SPUR FOR COCKFIGHTING

[75] Inventors: John J. Roman, Hato Rey; Nicolas M. Cartogena, Guaynabo, both of P.R.

[73] Assignee: Posti-Fort, Inc., Caguas, P.R.

[21] Appl. No.: 962,339

[22] Filed: Oct. 16, 1992

[51] Int. Cl.⁵ ............................................. A01K 45/00
[52] U.S. Cl. ..................................................... 119/174
[58] Field of Search .......................... 119/174, 144, 29; 132/73

[56] References Cited

U.S. PATENT DOCUMENTS

| | | | |
|---|---|---|---|
| 2,694,254 | 11/1954 | Benbow | 30/297 |
| 3,224,412 | 12/1965 | Fuentes, Jr. | 119/1 |
| 3,766,889 | 10/1973 | Mills et al. | 119/144 |
| 3,834,354 | 9/1974 | Kelton | 119/144 |
| 4,186,686 | 2/1980 | Hernandez | 119/1 |

OTHER PUBLICATIONS

*Engineering Plastics*, vol. 2, pp. 98–99, 156–158 and 308–318 (American Society of Metals ed., 1st ed. 1988).
GE ULTEM Processing, pp. 10–19 (undated).
GE ULTEM Specifications, ULT-306G (Apr. 1990) RTB.

*Primary Examiner*—Gene Mancene
*Assistant Examiner*—Thomas Price
*Attorney, Agent, or Firm*—Banner, Birch, McKie & Beckett

[57] ABSTRACT

An artificial spur for cockfighting has a hub portion for attachment to the spur stub of a fighting cock and an elongated arcuate shank portion attached to one end to the hub portion and having at its opposite end a pointed tip. The spur is integrally formed of molded substantially transparent thermoplastic material. Most preferably, the thermoplastic material consists of an unmodified polyether-imide resin. The spur exhibits superior fighting effectiveness and durability as compared with custom made bone spurs, facilitates the detection of illegal spur adulterations, and may be mass produced at low cost and with uniform high quality using a thermosplastic injection molding process.

26 Claims, 2 Drawing Sheets

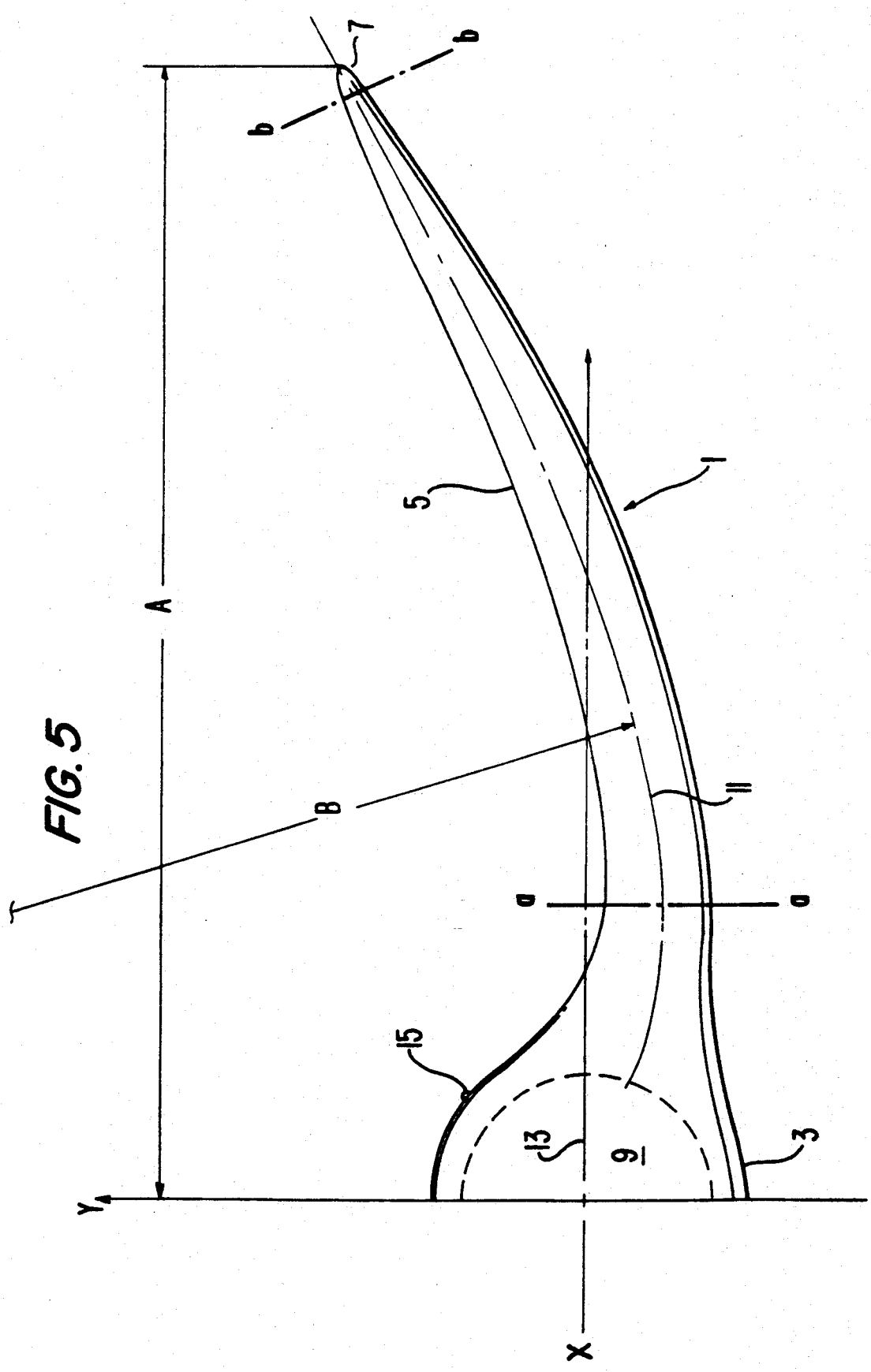

ARTIFICIAL SPUR FOR COCKFIGHTING

BACKGROUND OF THE INVENTION

The present invention relates to artificial (prosthetic) spurs applied to the legs of male chickens, i.e., roosters or cocks, used in the sport of cockfighting. In particular, the present invention relates to an improved design for a cock spur constructed of plastic material, and method for making the same.

Cockfighting is an immensely popular sport in Puerto Rico and a number of other territories and countries in Latin America and the Carribean. In Puerto Rico, for example, cockfighting is sanctioned and controlled by the government, and contributes significantly to the local economy. The sport is also popular and legal within several states of the United States. Cockfighting is a sport which is rich in history, lore and tradition.

To gain competitive advantage, game cocks are bred and raised to optimize their fighting ability. For the same reason, it is accepted practice to equip game cocks with prosthetic spurs which replace the often smaller less effective spurs that develop naturally on the backsides of the game cock's legs. This replacement is also desirable to provide a degree of spur uniformity (and hence fairness) amongst fighting cocks since natural spurs vary greatly in size and shape. Prosthetic spurs are typically prepared by skilled artisans from chicken spurs that have been removed from birds specially bred and raised for that purpose. The spurs are formed in a variety shapes and sizes to suit the particular tastes of the artisan and/or competitor. To raise a bird to the point that its spurs can be used takes about eight months. Then, the spurs must be removed and a painstaking manual cleaning, compressing and forming process performed to produce a custom set of prosthetic spurs (or "postizas" as they are known in Latin America). Accordingly, the cost of such spurs is very high, perhaps currently $175 on average. Prosthetic spurs have, to a lesser extent, also been custom made from other bone-like animal by-products such as turtle shell and turkey spurs.

All such custom spurs are very expensive, and no two sets of spurs will be exactly alike. Varying degrees of strength, durability and fighting effectiveness of the spurs will be achieved depending on the starting material and custom forming process utilized, and the skills and tastes of the artisan. The expense of and variation in quality among custom made spurs has an undesirable impact on the sport. Many persons are precluded from participation in the sport due to the high cost. An inequity arises in that not all competitors will be able to afford the high price of premium quality custom spurs, and thus certain persons will be at a competitive disadvantage due to their lesser financial status. Furthermore, the inherent unavoidable differences among custom spurs can have a significant impact on the outcome of a fight, so that the outcome may not accurately reflect the competing birds' true relative fighting abilities.

Another problem encountered in the sport of cockfighting is the unsportsmanlike and illegal use of chemicals, e.g., drugs and poisons, applied to or inserted in the prosthetic spurs of the fighting cocks in order to gain a competitive advantage. Since custom made bone spurs are not transparent (at best natural spurs are semi-transparent or translucent) and are irregular in color (colors within a given spur, and from spur to spur, can range from black to white), the use of illegal chemical is often difficult to detect.

Attempts have been made to produce and promote artificial cock spurs made from non-organic materials such a metal and plastics. Heretofore such spurs have not been widely accepted.

Benbow U.S. Pat. No. 2,694,254 discloses a steel gaff to be applied to the spur of a fighting cock, with provision made for adjusting the angle of the gaff during the course of a cockfight. Metal gaffs have been used for cockfighting to some degree in the United States since the 17th century. The practice has never been accepted to any significant extent in Puerto Rico and Latin America.

Hernandez U.S. Pat. No. 4,186,686 discloses a prosthetic spur made of aluminum. This spur has had some acceptance in the states of Florida, Louisiana and Texas. However, in Puerto Rico and Latin America there is a strong resistance to the use of metal on fighting cocks and thus the use of metal spurs has not caught on there.

Many followers of the sport are of the opinion that a metal spur causes more damage than a bone spur and that a special type of cock is required for their use. Another problem that arises with the use of metal spurs is the possibility of fraud and deception, e.g., by competitors who would attempt to pass off their game cock as being equipped with aluminum spurs when, in fact, it is equipped with spurs made from a much harder metal such as titanium steel (that would confer an unfair competitive advantage). Still another problem that arises from the use of metal spurs is the difficulty in detecting illegal spur adulterations, due to the opaque appearance of the spur material. For example, in addition to the problem with illegal chemicals as described above, the inventors are aware of an instance where batteries were inserted into spurs so that upon contact the spurs would cause an electrical shock to paralyze the opposing rooster.

Fuentes, Jr. U.S. Pat. No. 3,224,412 discloses a prosthetic spur formed of molded and cured fiber-reinforced thermoset plastic resin such as epoxy. The molding process is extremely labor intensive and time consuming. For example, glass fibers must be manually arranged within a mold, then liquid resin is manually poured into the mold over the fiber. Next, the resin must be allowed to cure for a number of hours at controlled temperatures.

The Fuentes, Jr. spurs never achieved widespread acceptance. While the spurs had some cost advantage over custom made bone spurs, their expense was still necessarily quite high due to the labor and time required to produce each spur. Furthermore, the manual nature of the process undoubtedly made it very difficult to produce spurs of uniform quality on a mass production basis.

Most significantly, the Fuentes, Jr. spurs and similar fiber reinforced spurs produced by others do not have sufficient strength characteristics to withstand the rigors of a cockfight. In particular, it was found that such spurs were quite brittle and would frequently break or fall apart (particularly in the area of the pointed tip) during the course of a fight. These spurs are also susceptible to illegal tampering since their creamy substantially opaque appearance makes detection of illegal chemical and other adulterations difficult.

Great advances have been made in recent years in the development of high performance engineering thermoplastics (ETPs) which exhibit substantially improved mechanical and other properties as compared with the so-called work horse grade engineering thermoplastics, and non-engineering thermoplastics such as the commodity resins polystyrene and polyethylene. A particularly outstanding high performance thermoplastic which has been in use since 1982 is polyetherimide (PEI) resin. As described in the standard industry text *Engineering Plastics*, vol. 2, pg. 156 (American Society of Metals ed., 1eg. 1988), PEI resins are primarily used in the automotive, electrical/electronic, packaging, aircraft, industrial and medical fields. Other uses are as appliances and hardware, and in the field of fluid engineering.

SUMMARY OF THE INVENTION

In view of the foregoing, it is an object of the present invention to provide an artificial cock spur that can be uniformly produced at a low cost on a mass production basis, whereby the cost of good spurs will not present an entry barrier to would be participants in the sport, and a greater degree of fairness and equity can be achieved in each fight.

It is a further object of the invention to provide an artificial cock spur that exhibits superior strength, resilience and durability characteristics, such that the spur has excellent fighting effectiveness and can withstand the rigors of multiple fights without breaking.

It is a still further object of the invention to provide an artificial cock spur that can withstand (without significant deformation, loss of strength or charring) repeated application of heat, in the form of a flame and hot wax, to a hub portion thereof as part of the conventional technique of fitting the spur to and removing it from a bird's leg.

It is yet another object of the invention to provide an artificial cock spur that is substantially transparent so as to facilitate the detection of illegal chemicals and other spur adulterations.

Still another object of the invention is to provide an artificial cock spur made of a synthetic material which is resistant to chemical reagents and the like employed by cockfight officials to detect the presence of and/or remove illegal chemicals.

An additional object of the present invention is to provide an artificial cock spur that so resembles a natural spur in appearance, weight and performance that it is considered acceptable and not unsportsmanlike by followers and regulators of the sport.

Yet another object of the invention is to provide an artificial cock spur sized and configured to comply with the requirements of local regulatory agencies while at the same time optimizing fighting effectiveness.

These and other objects are achieved by the present invention which, in one aspect, comprises an artificial spur for cockfighting. The spur has a hub portion for attachment to a spur stub of a fighting cock and an elongated arcuate shank portion attached at one end to said hub and having at its opposite end a pointed tip. The spur is formed, preferably integrally (as one piece) of molded substantially transparent thermosplastic material.

Preferably, the spur is made with a high performance engineering thermoplastic having specified minimum values of impact strength, tensile strength and flexural modulus.

Most preferably, the thermoplastic material consists of an unmodified polyether-imide resin. Such a resin exhibits outstanding mechanical properties, is naturally transparent and inherently flame retardant, and has other qualities that make it a particularly advantageous artificial spur material.

The invention also resides in a method of making the above-described artificial cock spur by injection molding. In the invention method, an injection molding apparatus is provided, equipped with a mold for forming a spur having a hub portion for attachment to a spur stub of a fighting cock, and an elongated arcuate shank portion attached at one end to said hub portion and having at its opposite end a pointed tip. A supply of substantially transparent thermoplastic material is provided. A charge of the thermoplastic material is heated in a controlled manner so as to cause it to flow, without causing significant permanent change to the properties of the thermoplastic material. Next, the heated flowable charge of thermoplastic material is injected into a cavity of the mold and the injected thermoplastic material is allowed to cool and solidify to form a molded spur. Finally, the molded spur is ejected from the mold cavity.

It is preferable to inject the thermoplastic material into the mold cavity through a single gate located in a portion of the mold corresponding to a lower portion of the hub portion adjacent to the end of the shank portion connected to the hub portion. It is also preferable to control the temperature of the mold within a specific elevated temperature range during the injection, cooling and solidifying of the thermoplastic material.

Further objects, features and advantages of the present invention will become apparent and fully understood from the following detailed description of the preferred embodiments, taken in connection with the appended drawings.

BRIEF DESCRIPTION OF THE DRAWINGS

FIG. 5 is a view corresponding to that of FIG. 2, rotated so that the spur is oriented horizontally and superimposed on a set of coordinate axes.

DETAILED DESCRIPTION OF THE PREFERRED EMBODIMENTS

Figure 1:
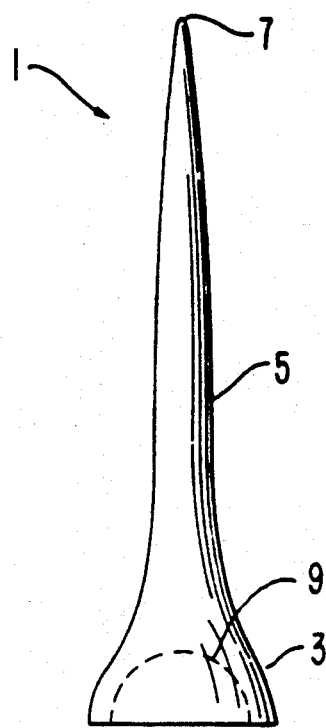
FIG. 1 is a front elevational view of an artificial spur in accordance with a preferred embodiment of the present invention.
Figure 2:
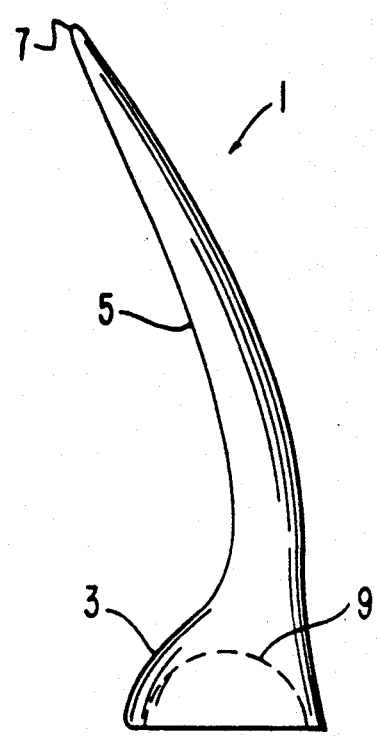
FIG. 2 is a side elevational view of the artificial spur shown in FIG. 1.
Figure 3:
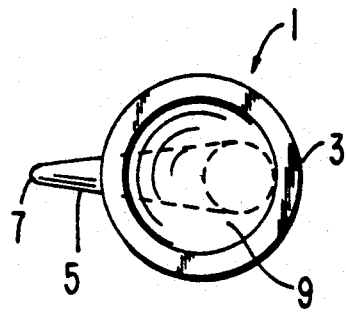
FIG. 3 is a bottom plan view of the artificial spur shown in FIG. 1.

A preferred configuration of an artificial spur 1 made in accordance with the present invention is illustrated in FIGS. 1-3 and 5. Referring first to FIGS. 1-3, spur 1 comprises a hub portion 3 and an elongated shaft portion 5 terminating in a pointed tip 7. Hub portion 3 is hollow and has the general shape of a sphere sectioned along a central plane. The walls thereof define a semispherical cavity or socket 9 for receiving the stub spur of a fighting cock that remains after its natural spur has been removed. From an area adjacent to the bottom of socket 9 extends elongated shaft portion 5. Shaft portion 5 is preferably solid and tapered continuously along its length toward pointed tip 7. The transitions between hub portion 3, shank portion 5 and pointed tip 7 are smooth and uninterrupted.

Reference is now made to FIG. 5, showing spur 1 of the present invention oriented horizontally with pointed tip 7 pointing upwardly and superimposed on a set of (x-y) coordinate axes. This view illustrates more clearly the dimensions and shape of the preferred spur configuration. The invention is not limited to the illustrated configuration. Other shapes and sizes may obviously be utilized depending on the regulations of the locality where the spur is to be used, and the preferences of the competitor. However, special design considerations must be given to a spur produced by thermoplastic injection molding in accordance with the present invention. The inventors have found that the illustrated configuration can be injection molded without particular difficulty (in a manner to be described hereinafter) and provides a weapon with a high degree of fighting effectiveness and durability (particularly resistance to breakage). The dimensions have been optimized to (1) comply with the size limitation imposed in Puerto Rico (other jurisdictions will impose different limitations and the spur can be modified accordingly); and (2) minimize thicknesses (and hence weight) to maximize fighting effectiveness while retaining adequate strength to resist breakage and excessive flex.

The overall length (A) is 1.552 inches, just under the maximum length of 1 and 9/16 th inches allowed in Puerto Rico. Dimension B represents the fixed radius of curvature of the major portion of shank 5, between section line (a—a) and (b—b). In the preferred embodiment, this radius is 2.078 inches. The inventors have found that with thermoplastic material in accordance with the present invention, significantly smaller radii (e.g. less than 2.0 inches (5.08 cm)) can result in excessive bending of the shank when a thrust is made against an opposing rooster.

The shank 5 is substantially circular in cross-section so as to provide uniform strength characteristics in all directions. Shank 5 tapers continuously along its entire length. At section line (a—a), the diameter of shank 5 is 0.150 inches. At section line (b—b) the diameter is 0.032 inches. Tip 7 has a circular conical shape.

Shank 5 is advantageously shaped so that it is continuously arced along its length. The arc initially extends downwardly adjacent to where shank 5 is connected to hub 3, reaches a local minimum in the region of section line (a—a) where the aforementioned fixed radius of curvature begins, and then begins a climb up to pointed tip 7. As can be seen, the arc is such that a central axis 11 of shank 5 dips below a central axis 13 of hub 3 and then extends above central axis 13 toward pointed tip 7. The axes can be seen to intersect at an approximate mid-point along the length of spur 1. The disclosed spur design optimizes the fighting effectiveness of the spur, e.g., by (1) maintaining the pointed tip 7 just slightly above the point of attachment to the bird's leg; (2) providing an angle of attack of the pointed tip which is closely matched to the natural striking motion of a fighting cock; and (3) resisting excessive bending of shank 5.

Spur 1 is integrally formed of molded substantially transparent thermoplastic material, preferably a high performance thermoplastic material having certain mechanical and other properties as specified below. ("Substantially transparent" as used herein includes colored transparent material.) Unlike the brittle thermoset materials used to produce artificial spurs in accordance with the Fuentes, Jr. patent mentioned above, the inventors have found that thermoplastic materials exhibit greater impact strength and other mechanical properties better suited to the rigors of cockfighting.

The provision of a transparent spur greatly reduce incidences of illegal spur adulterations, e.g., application of illegal chemicals to the spur, by greatly facilitating the detection thereof. In particular, with a transparent spur, when the spur is held up to a source of light, the presence of illegal chemicals on the outside of the spur, even chemicals applied as clear liquids, can be readily perceived as changes in the surface qualities of the spur. Furthermore, any internal adulteration could also readily be seen through the transparent material. Such easy detection is not possible with the above described prior art metal and plastic spurs which are substantially opaque, nor with custom made bone spurs which are at best semitransparent or translucent.

High impact strength is essential for an effective artificial cock spur, since during a fight the spur will be subjected to severe and repeated impacts, e.g., against the opposing rooster and the pit walls and floors.

Material hardness is also very important for maintaining sharpness of the tip and avoiding scratches and gouges that could significantly weaken the spur. Tensile strength and harness and closely correlated so that thermoplastics having a high tensile strength will also have a high degree of hardness.

It is also important that the spur exhibit substantial rigidity so that when a fighting cock lunges at and contacts the opposing rooster with the spur tip or shank, the spur resists buckling or substantial flex. A good measure of rigidity is the flexural modulus.

A particularly advantageous high performance ETP for the spur of the present invention is polyether-imide resin, which is naturally transparent and amber is color. A suitable formulation is marketed as ULTEM 1000 by General Electric Company. While the invention contemplates the use of polyether-imide resin reinforced with a small amount of glass to increase rigidity, the inventors have found it preferable to use the resin without glass since then greater impact strength is obtainable along with satisfactory rigidity. Spurs including glass reinforcement were shown during use tests conducted under actual and simulated fighting conditions to be more prone to breakage (especially in the tip area) than those without any reinforcement.

Unmodified polyether-imide resin exhibits outstanding impact strength, hardness and rigidity as indicated by the following average (nominal) property values published by General Electric for ULTEM 1000 resin:
Tensile Strength: 15,200 psi (105 MPa) (ASTM D638)
Flexural Modulus: 480,000 psa (3,300 MPa) (ASTM D790)
Izod Impact (unnotched): 25 ft-lb/in (1,300 J/m) (ASTM D256)

As a rule of thumb, a properly controlled thermoplastic injection molding process should yield parts having mechanical properties within a range of plus or minus 10% of the above specified test values.

Tests of spurs configured as shown in the drawings, conducted under actual and simulated fighting conditions, have proven the particular suitability of unmodified polyether-imide resin as a spur material and the importance of the above-mentioned mechanical properties. Whereas custom made bone spurs may typically break during the course of a single fight, spurs made in accordance with the present invention will typically last for 5 or more fights without breakage.

In addition to polyether-imide resin's outstanding mechanical properties and natural transparency, its natural color, high softening temperature, inherent flame and chemical resistance, and suitability for melt processing using conventional high volume injection molding equipment make it the spur material of choice.

The natural amber color is pleasing and within the range of colors deemed acceptable by followers of the sport. As a result there is no need to add pigments that could degrade somewhat the physical properties of the natural resin and destroy the transparency of the material.

Heat and flame resistance are important properties for withstanding application of a hot wax to the hub portion 3 during the conventional process of applying the spur to a bird's leg, and application of a flame to hub portion 3 to melt and remove wax from the hub 3. (The spur applying and removing processes are described below in further detail). Polyether-imide resin is inherently flame retardant. In particular, ULTEM 1000 resin has a heat deflection temperature of 392° F. (200°C.) at 264 psi (1.82 MPa,) and a UL 94 flammability rating of V-O at 0.016 inch (0.41 mm) thickness, so that it can withstand these conditions without deformation or degradation. As a result, it is unnecessary to modify the resin to impart flame and heat resistance, which modification could itself lead to degradation of the mechanical properties of the material.

Chemical resistance is important so that the spur can withstand the application of chemical reagents and cleansers (e.g., alcohol, ether and pumice powder) applied to the spurs by regulators of the sport to detect and/or remove any illegal chemicals. Polyether-imide resin resists a broad range of chemicals, including most hydrocarbons, nonaromatic alcohols and fully halogenated solvents. The resin also offers good resistance to mineral acids, and can tolerate short term exposure to mild bases.

Other high performance thermoplastic materials that may be used in the practice of the present invention include polysulfones, fluoropolymers, polyamideimides, polyarylates, polyarylether ketones, polyaryl sulfones/polyether sulfones, polybenzimidazoles, polyimides and liquid crystal polymers.

A significant advantage of spur 1 of the present invention is that it can be uniformly produced at low cost on a mass production basis using conventional thermoplastic molding equipment. The preferred technique involves an initial drying step to remove moisture absorbed by the raw plastic material. Suitable plastic drying apparatus and techniques are well known in the art. Next, the dried material is placed in a hopper of an injection molding apparatus equipped with a mold having a cavity corresponding to the shape of spur 1, and the injection molding process is begun.

A charge of the thermoplastic material is heated so as to cause it to flow. This heating should be controlled in accordance with the recommendations of the plastic supplier so as to avoid effecting significant permanent change to the properties of the thermoplastic material. The flowable charge is then injected under pressure into the mold cavity where the material is allowed to cool and solidify to form the molded spur. The temperature of the mold should be controlled within a certain elevated temperature range so that the flowable material is allowed to completely fill the mold cavity and all air is allowed to escape through appropriately located vents before the material hardens. Such temperature control is standard in the art and may be provided, e.g., using cartridge-type heaters or fluid heating systems. The inventors have found it advantageous to inject the molten thermoplastic into the mold cavity through a single gate located in a portion of the mold corresponding to a lower portion of hub portion 3 adjacent to the end of shank portion 5 connected to hub portion 3. This preferred gate location is evident from FIG. 5, where a small injection stub 15 which remains on the finished spur is illustrated. This arrangement avoids a point of weakness (corresponding to the gate location) being formed within the shank where the greatest strength is required, and at the same time allows the molten thermoplastic material to flow evenly throughout and completely fill the mold cavity.

Once the plastic material within the mold cavity is hardened, the molded spur is ejected in a conventional manner. Preferably, the mold is provided with a smooth mirror finish so that a correspondingly smooth spur surface is obtained without polishing operations.

Figure 4:
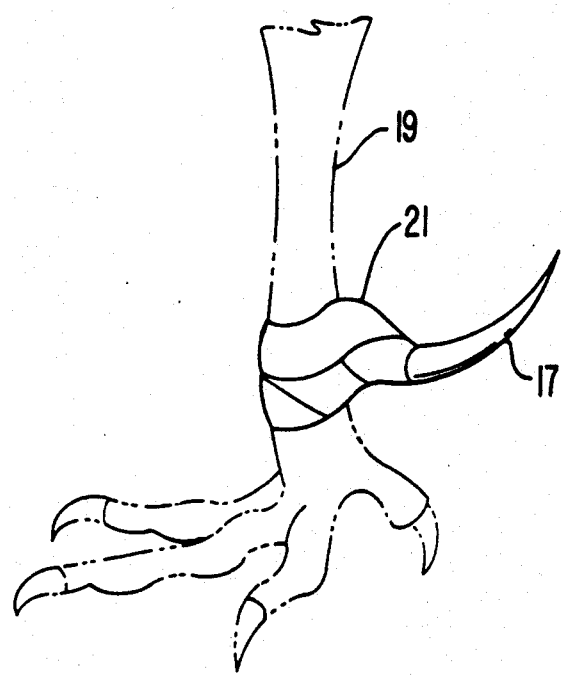
FIG. 4 is a perspective view illustrating an artificial cock spur applied to the leg of a chicken in accordance with a conventional technique.

FIG. 4 shows a prior art prosthetic spur 17 (having an outward configuration which is generally similar to the spur of the present invention) secured in a conventional manner to a game cock's leg 19. The process for applying the artificial spur of the present invention to the leg of a game cock corresponds to the conventional process, and is now briefly described with reference to FIGS. 1-4.

The first step is to cut off the game cock's original spur, leaving only a small stub the approximate size of socket 9. Once the natural stub is prepared, cavity 3 is filled with a hot liquid wax. Wax specially made for this purpose is available and comes in a solid bar. The bar is heated with an instrument resembling a welding iron, or with a match. Once liquified, the wax is poured into socket 3. It is allowed to cool a bit and then the socket is placed over the natural hub. Once aligned on the leg and after the wax has set, plain white tape 21 is used to anchor the spur to the cock's leg. The spur can be further secured by wrapping and tying a length of string (not shown) about the first layer of tape. Then, a second layer of tape 21 is wrapped over the string and first layer.

To remove the spur, the tape and any string are unwrapped. Then, the wax in socket 9 is softened by applying heat thereto to release the hold on the spur stub. This is typically done by applying briefly to the hub 3 a flame from a match, lighter or the like. The wax can then be completely removed from socket 9 by further application of heat to cause the wax to flow freely out of socket 9.

The present invention has been described in terms of preferred embodiments thereof. Numerous other embodiments, variations and modifications within the scope and spirit of the invention as defined in the appended claims will occur to those having ordinary skill in the art upon reading this disclosure.

We claim:

1. An artificial spur for cockfighting, comprising a hub portion for attachment to a spur stub of a fighting cock and an elongated arcuate shank portion attached at one end to said hub portion and having at its opposite end a pointed tip, said spur being formed of molded substantially transparent thermoplastic material.

2. An artificial spur according to claim 1, wherein said thermoplastic material has a nominal Izod impact strength (unnotched) of at least 25 ft-lb/in (1300 J/m).

3. An artificial spur according to claim 1, wherein said thermoplastic material has a nominal tensile strength of at least 15,200 psi (105 MPa).

4. An artificial spur according to claim 1, wherein said thermoplastic material has a nominal flexural modulus of at least 480,000 psi (3,300 MPa).

5. An artificial spur according to claim 1, wherein said thermoplastic material has a nominal Izod impact strength (unnotched) of at least 25 ft-lb/in (1300 J/m), a nominal tensile strength of at least 15,200 psi (105 MPa), and a nominal flexural modulus of at least 480,000 psi (3,300 MPa).

6. An artificial spur according to claim 1, wherein said thermoplastic material is free of glass reinforcing material.

7. An artificial spur according to claim 6, wherein said thermoplastic material comprises a polyether-imide resin.

8. An artificial spur according to claim 1, wherein said thermoplastic material comprises a polyether-imide resin.

9. An artificial spur according to claim 1, wherein said thermoplastic material consists of an unmodified polyether-imide resin.

10. An artificial spur according to claim 1, wherein said spur is integrally formed as one piece.

11. An artificial spur according to claim 10, wherein said shank is substantially circular in cross-section and tapered along its length.

12. An artificial spur according to claim 11, wherein the arc of said shank has a fixed radius of curvature along a major portion thereof.

13. An artificial cock spur according to claim 12, wherein said fixed radius of curvature is at least 5.08 cm (2 inches).

14. An artificial cock spur according to claim 13, wherein said arc reaches a local minimum point between said pointed tip and said hub portion, whereby viewing the spur in a horizontal orientation with the pointed tip pointed upwardly, a central axis of the shank dips below a central axis of said hub and then extends above said central axis of the hub to said pointed tip.

15. A method of making an artificial spur for cockfighting, comprising the steps of:
providing an injection molding apparatus equipped with a mold for forming a spur having a hub portion for attachment to a spur stub of a fighting cock, and an elongated arcuate shank portion attached at one end to said hub portion and having at its opposite end a pointed tip;
providing a supply of substantially transparent thermoplastic material;
heating a charge of said thermoplastic material in a controlled manner so as to cause it to flow, without causing significant permanent change to the properties of the thermoplastic material;
injecting into a cavity of said mold the heated flowable charge of thermoplastic material;
allowing the injected thermoplastic material to cool and solidify within said mold cavity, whereby a molded spur is formed; and
ejecting the molded spur from the mold cavity.

16. The method according to claim 15, wherein the charge of thermoplastic material is injected into said mold cavity through a single gate located in a portion of the mold corresponding to a lower portion of said hub portion adjacent to said one end of the shank portion.

17. The method according to claim 16, wherein the temperature of the mold is controlled within a certain elevated temperature range during the injection, cooling and solidifying of the thermoplastic material.

18. The method according to claim 15, further comprising the step of removing moisture from the thermoplastic material prior to the heating step.

19. The method according to claim 15, wherein said thermoplastic material has a nominal Izod impact strength (unnotched) of at least 25 ft-lb/in (1300 J/m).

20. The method according to claim 15, wherein said thermoplastic material has a nominal tensile strength of at least 15,200 psi (105 MPa).

21. The method according to claim 15, wherein said thermoplastic material has a nominal flexural modulus of at least 480,000 psi (3,300 MPa).

22. The method according to claim 15, wherein said thermoplastic material has a nominal Izod impact strength (unnotched) of at least 25 ft-lb/in (1300 J/m), a nominal tensile strength of at least 15,200 psi (105 MPa), and a nominal flexural modulus of at least 480,000 psi (3,300 MPa).

23. The method according to claim 15, wherein said thermoplastic material is free of glass reinforcing material.

24. The method according to claim 23, wherein said thermoplastic material comprises a polyether-imide resin.

25. The method according to claim 15, wherein said thermoplastic material comprises a polyether-imide resin.

26. The method according to claim 15, wherein said thermoplastic material consists of an unmodified polyether-imide resin.

* * * * *

REEXAMINATION CERTIFICATE (3258th)
United States Patent [19]
Roman et al.

[11] B1 5,219,396
[45] Certificate Issued Jul. 8, 1997

[54] ARTIFICIAL SPUR FOR COCKFIGHTING

[75] Inventors: John J. Roman, Hato Rey; Nicolas M. Cartogena, Guaynabo, both of Puerto Rico

[73] Assignee: Posti-Fort, Inc., Caguas, Puerto Rico

Reexamination Request:
No. 90/003,870, Jun. 29, 1995

Reexamination Certificate for:
Patent No.: 5,219,396
Issued: Jun. 15, 1993
Appl. No.: 962,339
Filed: Oct. 16, 1992

[51] Int. Cl.⁶ .................................................. A01K 45/00
[52] U.S. Cl. .................................................. 119/174
[58] Field of Search ............... 264/331.18; 73/861.57; 428/16; 524/91; 132/73; 81/177.3

[56] References Cited

U.S. PATENT DOCUMENTS

| | | |
|---|---|---|
| 2,560,414 | 7/1951 | Cheney. |
| 2,834,023 | 5/1958 | Lieb. |
| 3,224,412 | 12/1965 | Fuentes, Jr.. |
| 3,296,347 | 1/1967 | Fuentes, Jr.. |
| 3,740,542 | 6/1973 | Brody ................................ 428/16 |
| 3,768,309 | 10/1973 | Hart ................................ 73/861.57 |
| 4,346,144 | 8/1982 | Craven ............................. 524/91 |
| 4,521,583 | 6/1985 | Kohli. |
| 4,567,216 | 1/1986 | Oureshi et al.. |
| 4,569,288 | 2/1986 | Grelle et al.. |
| 4,604,319 | 8/1986 | Evans et al.. |
| 4,650,821 | 3/1987 | Leonard ......................... 264/331.18 |
| 4,681,585 | 7/1987 | Sayano et al.. |
| 4,728,698 | 3/1988 | Isayev et al.. |
| 4,760,106 | 7/1988 | Gardner et al.. |

OTHER PUBLICATIONS

Billmeyer, Fred W., Jr., "Textbook Of Polymer Science", 1984, pp. 387–389.
Odian, George, "Principles of Polymerization", 1970, p. 295.
Shah, Vishu, "Handbook of Plastics Testing Technology", p. 147.
General Electric, "The Comprehensive Guide To Material Properties, Design, Processing, and Secondary Operations".
Office Action of Mar. 16, 1965, from Fuentes '412 Fuentes, Jorge, Trial Testimony of, pp. 138–161.
Ultem polyetherimide resin, 82 pages.
Ultem 1000 Series Unreinforced Grades, General Electric Company, 7 pages.
Reprint by Information Access Co. of article from Jun. 1991 issue of Plastics Technology, pp. 2–8.
Leonard, Vinyl and Diene Monomers, John Wiley & Sons, pp. 105–203 1970.
Luskin, Modern Plastics Encyclopedia, pp. 14–18. 1984.
Rosato et al. Injection Molding Handbook, Van Nostrand Reinhold Company, pp. 183–187 1988.

*Primary Examiner*—Robert A. Clarke

[57] ABSTRACT

An artificial spur for cockfighting has a hub portion for attachment to the spur stub of a fighting cock and an elongated arcuate shank portion attached to one end to the hub portion and having at its opposite end a pointed tip. The spur is integrally formed of molded substantially transparent thermoplastic material. Most preferably, the thermoplastic material consists of an unmodified polyether-imide resin. The spur exhibits superior fighting effectiveness and durability as compared with custom made bone spurs, facilitates the detection of illegal spur adulterations, and may be mass produced at low cost and with uniform high quality using a thermoplastic injection molding process.

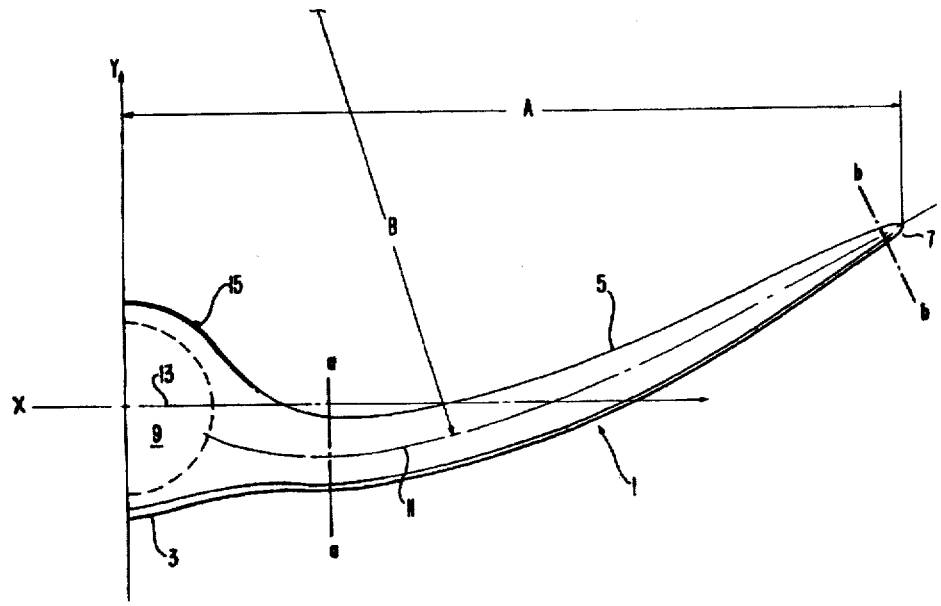

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–26 is confirmed.

* * * * *